(12) United States Patent
McCamant et al.

(10) Patent No.: US 7,962,901 B2
(45) Date of Patent: Jun. 14, 2011

(54) USING DYNAMIC ANALYSIS TO IMPROVE MODEL CHECKING

(75) Inventors: Stephen McCamant, Boston, MA (US); Trishul Chilimbi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1458 days.

(21) Appl. No.: 11/406,207

(22) Filed: Apr. 17, 2006

(65) Prior Publication Data

US 2007/0244942 A1   Oct. 18, 2007

(51) Int. Cl.
*G06F 9/44* (2006.01)
*G06F 9/45* (2006.01)

(52) U.S. Cl. ............ 717/131; 717/126; 717/130; 703/22

(58) Field of Classification Search ........................ None
See application file for complete search history.

(56) References Cited

U.S. PATENT DOCUMENTS

| | | | |
|---|---|---|---|
| 4,862,373 A | 8/1989 | Meng et al. |
| 5,220,667 A | 6/1993 | Ichieda |
| 5,333,311 A | 7/1994 | Whipple, II |
| 5,713,008 A | 1/1998 | Falkner |
| 5,740,443 A | 4/1998 | Carini |
| 5,774,685 A | 6/1998 | Dubey |
| 5,815,720 A | 9/1998 | Buzbee |
| 5,909,578 A | 6/1999 | Buzbee |
| 5,925,100 A | 7/1999 | Drewry et al. |
| 5,940,618 A | 8/1999 | Blandy et al. |
| 5,950,003 A | 9/1999 | Kaneshiro et al. |
| 5,950,007 A | 9/1999 | Nishiyama et al. |
| 5,953,524 A | 9/1999 | Meng et al. |
| 5,960,198 A | 9/1999 | Roediger et al. |
| 6,026,234 A | 2/2000 | Hanson et al. |
| 6,073,232 A | 6/2000 | Kroeker et al. |
| 6,079,032 A | 6/2000 | Peri |
| 6,145,121 A * | 11/2000 | Levy et al. .................... 717/135 |
| 6,148,437 A | 11/2000 | Shah et al. |
| 6,189,036 B1 | 2/2001 | Kao |
| 6,216,219 B1 | 4/2001 | Cai et al. |
| 6,233,678 B1 | 5/2001 | Bala |
| 6,311,260 B1 | 10/2001 | Stone et al. |
| 6,321,240 B1 | 11/2001 | Chilimbi et al. |
| 6,330,556 B1 | 12/2001 | Chilimbi et al. |
| 6,360,361 B1 | 3/2002 | Larus et al. |
| 6,370,684 B1 | 4/2002 | De Pauw et al. |
| 6,381,735 B1 | 4/2002 | Hunt |

(Continued)

OTHER PUBLICATIONS

Dynamic Points-To Sets: A Comparison with Static Analyses and Potential Applications in Program Understanding and Optimization Markus Mock, Manuvir Das, Craig Chambers, and Susan J. Eggers Microsoft Research Technical Report MSR-TR-2001-38 Published: Mar. 2001.*

(Continued)

*Primary Examiner* — Emerson C Puente
*Assistant Examiner* — Paul Mills
(74) *Attorney, Agent, or Firm* — Klarquist Sparkman, LLP (57) ABSTRACT

Model checking has been used to verify program behavior. However, exploration of the model is often impractical for many general purpose programs due to the complexity of an exploding state space. Instead, a program is instrumented with code that records pointer dereference information. The instrumented program is executed thereby recording pointer dereference frequency information. Then, a model of the program is explored using the pointer dereference frequency information to direct state space exploration of the model.

18 Claims, 4 Drawing Sheets

U.S. PATENT DOCUMENTS

| | | | |
|---|---|---|---|
| 6,404,455 | B1 | 6/2002 | Ito et al. |
| 6,446,257 | B1 | 9/2002 | Pradhan et al. |
| 6,560,693 | B1 | 5/2003 | Puzak et al. |
| 6,560,773 | B1 | 5/2003 | Alexander et al. |
| 6,571,318 | B1 | 5/2003 | Sander et al. |
| 6,598,141 | B1 | 7/2003 | Dussud et al. |
| 6,628,835 | B1 | 9/2003 | Brill et al. |
| 6,651,243 | B1 | 11/2003 | Berry et al. |
| 6,658,652 | B1 | 12/2003 | Alexander et al. |
| 6,675,374 | B2 | 1/2004 | Pieper et al. |
| 6,704,860 | B1 | 3/2004 | Moore |
| 6,738,968 | B1 | 5/2004 | Bosworth et al. |
| 6,848,029 | B2 | 1/2005 | Coldewey |
| 6,886,167 | B1 | 4/2005 | Breslau et al. |
| 6,904,590 | B2 | 6/2005 | Ball et al. |
| 6,951,015 | B2 | 9/2005 | Thompson |
| 6,957,422 | B2 | 10/2005 | Hunt |
| 7,032,217 | B2 | 4/2006 | Wu |
| 7,058,936 | B2 | 6/2006 | Chilimbi et al. |
| 7,140,008 | B2 | 11/2006 | Chilimbi et al. |
| 7,159,038 | B2 | 1/2007 | Rychlicki |
| 7,181,730 | B2 | 2/2007 | Pitsianis et al. |
| 7,293,260 | B1 | 11/2007 | Dmitriev |
| 7,296,180 | B1 | 11/2007 | Waterhouse et al. |
| 7,343,598 | B2 | 3/2008 | Chilimbi et al. |
| 7,401,324 | B1 | 7/2008 | Dmitriev |
| 7,506,317 | B2 | 3/2009 | Liang et al. |
| 7,587,709 | B2 | 9/2009 | Chilimbi et al. |
| 7,607,119 | B2 | 10/2009 | Perelman et al. |
| 7,770,153 | B2 | 8/2010 | Chilimbi et al. |
| 2002/0133639 | A1 | 9/2002 | Breslau et al. |
| 2002/0144245 | A1 | 10/2002 | Lueh |
| 2002/0178401 | A1 | 11/2002 | Ball et al. |
| 2003/0145314 | A1 | 7/2003 | Nguyen et al. |
| 2003/0182654 | A1* | 9/2003 | Dmitriev ................ 717/151 |
| 2003/0204840 | A1 | 10/2003 | Wu |
| 2004/0015897 | A1 | 1/2004 | Thompson et al. |
| 2004/0015930 | A1 | 1/2004 | Wu |
| 2004/0025145 | A1 | 2/2004 | Dawson |
| 2004/0078381 | A1 | 4/2004 | Blandy et al. |
| 2004/0088699 | A1 | 5/2004 | Suresh |
| 2004/0103401 | A1 | 5/2004 | Chilimbi et al. |
| 2004/0103408 | A1 | 5/2004 | Chilimbi et al. |
| 2004/0111444 | A1 | 6/2004 | Garthwaite |
| 2004/0133556 | A1 | 7/2004 | Wolczko et al. |
| 2004/0181782 | A1 | 9/2004 | Findeisen |
| 2004/0215880 | A1 | 10/2004 | Chiimbi et al. |
| 2004/0216091 | A1 | 10/2004 | Groeschel |
| 2005/0086648 | A1 | 4/2005 | Andrews et al. |
| 2005/0091645 | A1 | 4/2005 | Chilimbi et al. |
| 2005/0149904 | A1 | 7/2005 | Ball et al. |
| 2005/0182603 | A1 | 8/2005 | Freitas et al. |
| 2005/0235257 | A1 | 10/2005 | Ball et al. |
| 2005/0246696 | A1 | 11/2005 | Alexander et al. |
| 2006/0070040 | A1 | 3/2006 | Chilimbi et al. |
| 2006/0155791 | A1 | 7/2006 | Tene et al. |
| 2006/0242636 | A1* | 10/2006 | Chilimbi et al. ............ 717/158 |
| 2006/0265438 | A1* | 11/2006 | Shankar et al. ............ 707/206 |
| 2006/0265694 | A1* | 11/2006 | Chilimbi et al. ............ 717/124 |
| 2007/0083856 | A1 | 4/2007 | Chilimbi et al. |
| 2007/0169000 | A1 | 7/2007 | Havin et al. |
| 2008/0005208 | A1 | 1/2008 | Vaswani et al. |

OTHER PUBLICATIONS

Automatic predicate abstraction of C programs Thomas Ball, Rupak Majumdar, Todd Millstein, Sriram K. Rajamani ACM SIGPLAN Notices, vol. 36, Issue 5 (May 2001) pp. 203-213.*

Dynamic Analysis from the Bottom Up Markus Mock Workshop on Dynamic Analysis, pp. 13-16 May 9, 2003.*

Hints to Accelerate Symbolic Traversal Kavita Ravi and Fabio Somenzi Charme'99, LNCS 1703, pp. 250-266 Year of Publication: 1999.*

Two-Level Tree Structure for Fast Pointer Lookup Hans-J. Boehm Archived via Wayback Machine Dec. 2, 2002, retrieved Sep. 13, 2010 http://web.archive.org/web/20021202232247/http://www.hpl.hp.com/personal/Hans_Boehm/gc/tree.html.*

Distributed Program Sampling Ben Liblit, Alex Aiken, Alice X. Zheng Year of Publication: 2003.*

An Empirical Study on the Granularity of Pointer Analysis in C Programs Tong Chen, Jin Lin, Wei-Chung Hsu and Pen-Chung Yew Languages and Compilers for Parallel Computing, 15th Workshop Year of Publication: 2002.*

Program Slicing with Dynamic Points-To Sets Markus Mock, Darren C. Atkinson, Craig Chambers, and Susan J. Eggers IEEE Transactions on Software Engineering, vol. 31, No. 8, pp. 657-678 Aug. 2005.*

Using Runtime Analysis to Guide Model Checking of Java Programs Klaus Havelund Proceedings of the 7th International SPIN Workshop on SPIN Model Checking and Software Verification pp. 245-264 Year of Publication: 2000.*

Model Checking Programs Willem Visser, Klaus Havelund, Guillaume Brat, Seungjoon Park, Flavio Lerda Automated Software Engineering, 10, pp. 203-232 Year of publication: 2003.*

Predicate Abstraction of ANSI-C Programs Using SAT Edmund Clarke, Daniel Kroening, Natasha Sharygina, Karen Yorav Formal Methods in System Design, 25, pp. 105-127 Year of publication: 2004.*

Symbolic Guided Search for CTL Model Checking Roderick Bloem, Kavita Ravi, Fabio Somenzi 37th Design Automation Conference Year of publication: 2000.*

Liblit et al., "Distributed Program Sampling," Department of Electrical Engineering and Computer Science, University of California, Berkely, 10 pages.

Ball and Rajamani, "Generating abstract explanations of spurious counterexamples in C programs," Technical Report MSR-TR-2002-09, 13 pages, Jan. 22, 2002.

Ball and Rajamani, "The SLAM project: Debugging system software via static analysis," 3 pages.

Ball and Rajamani, "Boolean programs: A model and process for software analysis," Technical Report MSR-TR-2000-14, 29 pages, Feb. 29, 2000 (updated Mar. 28, 2000).

Ball and Millstein, "Plymorphic Predicate Abstraction," Technical Report MSR-TR-200110, 22 pages, Jun. 17, 2002.

Ball et al., "SLAM and static driver verifier: Technology transfer of formal methods inside Microsoft," Technical Report MSR-TR-2004-08, 20 pages, Jan. 28, 2004.

Microsoft, "Static driver verifier—Finding driver bugs at compile-time," <http://www.microsoft.com/whdc/devtools/tools/sdv.mspx>, 2 pages (accessed Apr. 1, 2006).

"Dynamic Binary Analysis and Instrumentation," by Nicholas Nethercote, Nov. 2004 Ph.D. Dissertation. University of Cambridge.

"Precise Interprecedural Dataflow Analysis via Graph Reachability," by T. Reps, S. Horwitz, M. Sagiv, pp. 49-61, Conference Record of POPL'95: $22^{nd}$ ACM SIGPLAN-SIGACT Symposium on Principles of Programming Languages, 1995.

"Improving Model Checking with Dynamic Points-to Sets," by Stephen McCamant, 46 slides presented at MIT on Mar. 7, 2006.

Muchnick et al., "Two Approaches to Interprocedural Data Flow Analysis," Chapter 7 of *Program Flow Analysis: Theory and Applications*, © 1981 by Prentice-Hall, Inc., pp. 189-233.

Ammons et al., "Exploiting Hardware Performance Counters with Flow and Context Sensitive Profiling", PLDI (Jun. 1997), 12 pages.

Ammons et al., "Improving Data-Flow Analysis with Path Profiles," SIGPLAN '98 (1998), pp. 72-84.

Anderson et al., "Continuous Profiling: Where Have All the Cycles Gone?", ACM (Nov. 1997), pp. 357-390.

Annavaram et al., "Data Prefetching by Dependence Graph Precomputation", IEEE (2001), pp. 52-61.

Arnold et al., "A Framework for Reducing the Cost of Instrumented Code", Rutgers University Technical Report DCS-TR-424 (Nov. 2000), pp. 1-10.

Bacon, "A unified theory of garbage collection," ACM, Oct. 2004, 19 pages.

Bala et al., "Dynamo: A Transparent Dynamic Optimization System", ACM (2000), pp. 1-12.

Balakrishnan et al., "Analyzing Memory Accesses in $\chi 86$ Binary Executables", Proc. 13th Intl. Conference on Compiler Construction, LNCS 2985 (Apr. 2004), pp. 5-23.

Ball et al., "Efficient Path Profiling", IEEE (1996), pp. 46-57.

Berger et al., "Composing High-Performance Memory Allocators", ACM (2001), 11 pages.
Bush et al., "A Static Analyzer for Finding Dynamic Programming Errors", Software: Practice and Experience (2000), pp. 775-802.
Cahoon et al., "Data Flow Analysis for Software Prefetching Linked Data Structures in Java", IEEE (2001), 12 pages.
Calder et al., "Cache-Conscious Data Placement", ACM (Oct. 1998), 11 pages.
Chen et al., "Reducing Memory Latency via Non-Blocking and Prefetching Caches", ACM (1992), pp. 51-61.
Chen, "Using build integrated static checking to preserve correctness invariants," ACM, Oct. 2004, 10 pages.
Chilimbi et al., "Cache-Conscious Structure Definition", *Proceedings of the ACM SIGPLAN '99* (May 1999), 12 pages.
Chilimbi et al., "Cache-Conscious Structure Layout", *Proc. ACM SIGPLAN '99 Conf. on Programming Language Design and Impl.*, (May 1999), 12 pages.
Chilimbi et al., "Dynamic Hot Data Stream Prefetching for General-Purpose Programs", ACM (Jun. 2002), 11 pages.
Chilimbi, "Efficient Representations and Abstractions for Quantifying and Exploiting Data Reference Locality", ACM (Jun. 2001), pp. 191-202.
Chilimbi et al., "HeapMD: Identifying Heap-based Bugs Using Anomaly Detection," ACM (Oct. 2006) 10 pages.
Chilimbi et al., "Low-Overhead Memory Leak Detection Using Adaptive Statistical Profiling", Proc. 11th Intl. Conference on Architectural Support for Programming Language and Operating Systems (ASPLOS), (Oct. 2004), pp. 156-164.
Chilimbi et al., "On the Stability of Temporal Data Reference Profiles", PACT (Sep. 2001), 10 pages.
Chilimbi et al., "Using Generational Garbage Collection to Implement Cache-Conscious Data Placement", *Proceedings of the First International Symposium on Memory Management* (Oct. 1998), vol. 34(3), pp. 37-48.
Cifuentes, "Structuring Decompiled Graphs," Technical Report May 1994, Faculty of Information Technology, Queensland University of Technology, GPO Box 2434, Brisbane 4001, Australia (Apr. 1994), 15 pages.
Cooksey et al., "A Stateless, Content-Directed Data Prefetching Mechanism", ACM (2002), pp. 279-290.
Cowan et al., "Buffer Overflows: Attacks and Defenses for the Vulnerability of the Decade", DARPA information survivability conference and expo (DISCEX) (2000), pp. 1-11.
Crescenzi at al., "A Compendium of NP Optimization Problems," [Downloaded from the World Wide Web on Dec. 12, 2003], 20 pages.
Dean et al., "ProfileMe: Hardware Support for Instruction-Level Profiling on Out-of-Order Processors", Proc. 30th Annual Intl. Symp. on Microarchitecture (Dec. 1997), 12 pages.
Deaver et al., "Wiggins/Redstone: An On-line Program Specializer", Proceedings of the IEEE Hot Chips XI Conference (Aug. 1999), 29 pages.
Demsky et al., "Automatic Detection and Repair of Errors in Data Structures", Proceedings of 18th ACM SIGPLAN Conference on Object-Oriented Programming Systems, Language and Applications (OOPLSA) (Oct. 2003), pp. 78-95.
Demsky et al., "Role-Based Exploration of Object-Oriented Programs", Proceedings of 24th International Conference on Software Engineering (ISCE) (May 2002), pp. 313-334.
Diwan et al., "Memory-System Performance of Programs with Intensive Heap Allocation," ACM TOCS vol. 13, Issue 3, Aug. 1995, ISSN: 0734-2071, 30 pages.
Dor et al., "Cleanness Checking of String Manipulations in C Programs via Integer Analysis", Proc. 8th Int'l Static Analysis Symposium (Jun. 2001), 19 pages.
Dor et al., "CSSV: Towards a Realistic Tool for Statically Detecting All Buffer Overflows in C", PLDI'03 (Jun. 9-11, 2003), pp. 155-167.
Duesterwald et al., "Software profiling for hot path prediction: Less is more," Ninth International Conference on Architectural Support for Programming Languages and Operating Systems (Nov. 2000), pp. 202-211.

Edwards, "Black-Box Testing Using Flowgraphs: An Experimental Assessment of Effectiveness and Automation Potential", Software Testing, Verification and Reliability, vol. 10, No. 4 (Dec. 2000), pp. 249-262.
Eeckhout et al., "Workload Design: Selecting Representative Program-Input Pairs", Proceedings of the 2002 International Conference on Parallel Architectures and Compilation Techniques (2002), 12 pages.
English et al., "Loge: A self-organizing disk controller," Proc. USENIX Winter 1992 Tech. Conf., San Francisco, pp. 237-251 (Jan. 1992).
Ernst, "Dynamically Discovering Likely Program Invariants", PhD Thesis, University of Washington (Aug. 2000), pp. 1-127.
Evans et al., "Improving Security Using Extensible Lightweight Static Analysis", IEEE Software (Jan./Feb. 2002), pp. 42-51.
Evans et al., "LCLint: A Tool for Using Specifications to Check Code", SIGSOFT Symposium on the Foundations of Software Engineering (Dec. 1994), 10 pages.
Evans et al., "Splint Manual, Version 3.1.1-1", Secure Programming Group, University of Virginia Department of Computer Science (Jun. 5, 2003), 121 pages.
Evans, "Static Detection of Dynamic Memory Errors", SIGPLAN Conf. on Programming Language and Design Implementation (May 1996), 10 pages.
Evans, "Using Specifications to Check Source Code", TR-628, MIT Lab for Computer Science (Jun. 1994), 97 pages.
Foster et al., "A Theory of Type Qualifiers", Proc. ACM SIGPLAN '99 Conf. on Programming Language and Design Implementation (PLDI) (May 1999), 12 pages.
Gloy et al., "Procedure Placement Using Temporal-Ordering Information", ACM Transactions on Programming Languages and System, vol. 21 (1999), pp. 111-161.
Gonzalez et al., "Eliminating Cache Conflict Misses Through XOR-Based Placement Functions," ICS 97, 1997, pp. 76-83.
Griffioen et al., "Reducing File System Latency Using a Predictive Approach," Proceedings of the USENIX Summer 1994 Technical Conference on USENIX, 11 pages.
Guyer et al., "An Annotation Language for Optimizing Software Libraries", Proc. Second Conf. on Domain Specific Languages (Oct. 1999), 14 pages.
Halldorsson, "Approximations of Weighted Independent Set and Hereditary Subset Problems", JGAA, vol. 4, No. 1 (Apr. 2000), pp. 1-16.
Hangal et al., "Tracking Down Software Bugs Using Automatic Anomaly Detection", Proceedings of 22nd International Conference on Software Engineering (ICSE) (Jan. 1992), pp. 125-136.
Harris, "Dynamic Adaptive Pre-tenuring", Proceedings of the International Symposium on Memory Management (Oct. 2000), 9 pages.
Hastings et al., "Purify: Fast Detection of Memory Leaks and Access Errors", Proceedings of the Winter 1992 USENIX Conference (1992), 10 pages.
Hatfield et al., "Program Restructuring for Virtual Memory," IBM Sys. J., No. 3, pp. 168-192 (1971).
Hauck, "Configuration Prefetch for Single Context Reconfigurable Coprocessors," In Proceedings of the ACM/SIGDA International Symposium on Field Programmable Gate Arrays (Feb. 1998), pp. 65-74.
Heil et al., "Relational Profiling: Enabling Thread-Level Parallelism in Virtual Machines", *Proc. 33rd International Symposium on Microarchitecture* (Dec. 2000), pp. 1-10.
Hirzel et al., "Bursty Tracing: A Framework for Low-Overhead Temporal Profiling", *4th ACM Workshop on Feedback-Directed and Dynamic Optimization* (Dec. 2001), pp. 1-10.
Hirzel et al., "Understanding the Connectivity of Heap Objects", Proceedings of International Symposium on Memory Management (ISMM) (Jun. 2002), pp. 143-156.
Hollingsworth et al., "MDL: A Language and Compiler for Dynamic Program Instrumentation", *Proc. of the International Conference on Parallel Architectures and Compilations Techniques* (Nov. 1997), 12 pages.
Hölzle et al., "Reconciling Responsiveness with Performance in Purse Object-Oriented Languages", *ACM Transactions on Programming Languages and Systems* (Jul. 1996), pp. 1-40.

Horning, "The Larch Shared Language: Some Open Problems", Compass/ADT Workshop (Sep. 1995), 16 pages.
Joseph et al., "Prefetching Using Markov Predictors", ACM (1997), pp. 252-263.
Jouppi, "Improving Direct-Mapped Cache Performance by the Addition of a Small Fully-Associative Cache and Prefetch Buffers", IEEE (1990), pp. 364-373.
"JProfiler Manual," ejtechnologies, GmbH (2004), pp. 1-141.
Karlsson et al., "A Prefetching Technique for Irregular Accesses to Linked Data Structures", Sixth International Symposium on High-Performance Computer Architecture (Jan. 2000), 12 pages.
Khurshid et al., "An Analyzable Annotation Language," OOPSLA '02 (Nov. 2002), 15 pages.
Kistler et al., "Automated Data-Member Layout of Heap Objects to Improve Memory-Hierarchy Performance," ACM Transactions on Programming Language and Systems, (2000), 16 pages.
Klaiber et al., "An Architecture for Software-Controlled Data Prefetching", ACM (1991), pp. 43-53.
Kramer, "Examples of Design by Contract in Java Using Contract, the Design by Contract™ Tool for Java™", Object World Berlin '99, Design & Components (May 17-20, 1999), 26 pages.
Kroeger et al., "Predicting Future File-system Actions from Prior Events," Proc. USENIX Annual Tech. Conf., San Diego, pp. 1-10 (Jan. 1996).
Larochelle et al., "Statistically Detecting Likely Buffer Overflow Vulnerabilities", 2001 USENIX Security Symposium (Aug. 2001), 5 pages.
Larus, "Whole Program Paths," SIGPLAN '99 Conference on Programming Languages and Design (May 1999), 11 pages.
Leavens et al., "Enhancing the Pre-and Postcondition Technique for More Expressive Specifications", Proc. World Congress on Formal Methods in the Development of Computing Systems (Sep. 1999), 21 pages.
Leavens et al., "Preliminary Design of JML", Technical Report 98-06v, Iowa State University Department of Computer Science (Jun. 1998-2003; revised May 2003), 94 pages.
Leino, "Checking Correctness Properties of Object-Oriented Programs," Internet, http://research.microsoft.com/leino/paper/1 (Aug. 19, 2002), 49 pages.
Luk et al., "Compiler-Based Prefetching for Recursive Data Structures", ACM (Oct. 1996), pp. 222-233.
Melski et al., "Interprocedural Path Profiling", University of Wisconsin (Sep. 1, 1998), pp. 1-50.
Microsoft Corporation, "Scalable Program Analysis", Internet, http://research.microsoft.com/spa/ (downloaded on Sep. 5, 2003), 3 pages.
Mowry et al., "Design and Evaluation of a Compiler Algorithm for Prefetching", ACM (Oct. 1992), pp. 62-73.
Mowry et al., "Predicting Data Cache Misses in Non-Numeric Applications Through Correlation Profiling", International Symposium on Microarchitecture (1997), 7 pages.
Nevill-Manning et al., "Identifying Hierarchical Structure in Sequences: A Linear-time Algorithm", Journal of Artificial Intelligence Research (Sep. 1997), 7:67-82.
Palmer et al., "Fido: A Cache that Learns to Fetch," Proc. 17th Int'l Conf. on Very Large Databases, Barcelona, pp. 255-264 (Sep. 1991).
Patterson et al., "Informed Prefetching and Caching," Proc. 15th ACM Symp. on Operating System Principles, Copper Mountain Resort, CO, pp. 79-95 (Dec. 1995).
Petrank et al., "The Hardness of Cache Conscious Data Placement," 29th Annual ACM Symposium on Principles of Programming Languages (2002), 33 pages.
Raman, "Recursive Data Structure Profiling," Workshops on Memory System Performance, 2005, 10 pages. Proceedings of the 2005 workshop on memory system performance, Chicago, Illinois, Jun. 2005.
Roth et al., "Dependence Based Prefetching for Linked Data Structures", Proceedings of the 8th International Conference on Architectural Support (Oct. 1998), pp. 115-126.
Roth et al., "Effective Jump-Pointer Prefetching for Linked Data Structures", IEEE (1999), pp. 111-121.
Rubin et al., "An Efficient Profile-Analysis Framework for Data-Layout Optimizations", POPL (Jan. 2002), pp. 140-153.
Saavedra et al., "Improving the Effectiveness of Software Prefetching With Adaptive Execution", IEEE (1996), pp. 68-78.
Sastry et al., "Rapid Profiling Via Stratified Sampling", International Symposium on Computer Architecture (2001), pp. 1-12.
Savage et al., "Eraser: a dynamic data race detector for multithreaded programs", ACM Transactions on Computer Systems (TOCS) (Nov. 1997), 391-411.
Seidl et al., "Segregating Heap Objects by Reference Behavior and Lifetime", 8th Int'l Conf. on Architectural Support for Programming Languages and Operating Systems (Oct. 1998), 12 pages.
Shaham, "Automatic Removal of Array Memory Leaks in Java", (1999), 12 pages.
Srivastava, "ATOM: A System for Building Customized Program Analysis Tools", SIGPLAN '94 Conf. on Programming Language Design and Impl. (May 1994), 25 pages.
Srivastava et al., "Vulcan Binary Transformation in a Distributed Environment", Microsoft Research, MSR-TR-99-76 (Apr. 20, 2001), pp. 1-12.
Staelin et al., "Smart Filesystems," Proc. USENIX—Winter '91, Dallas, TX, pp. 45-51 (1991).
Stoutchinin et al., "Speculative Prefetching of Induction Pointers", Proceedings of 10th International Conference on Compiler Construction (2001), 15 pages.
Tait et al., "Detection and Exploitation of File Working Sets," IEEE, pp. 2-9 (1991).
"Technologies for Measuring Software Performance", Intel Corporation (2003), 4 pages.
Traub et al., "Ephemeral instrumentation for lightweight program profiling", Technical report, Harvard University (2000), pp. 1-13.
Truong et al., "Improving Cache Behavior of Dynamically Allocated Data Structures", PACT(1998), 8 pages.
Ung et al., "Optimising Hot Paths in a Dynamic Binary Translator," In Workshop on Binary Translation, Oct. 2000, pp. 55-65.
Vanderwiel et al., "Data Prefetch Mechanisms", ACM Computing Surveys, vol. 32, No. 2 (Jun. 2000), pp. 174-199.
Wahls et al., "The Direct Execution of SPECS-C++: A Model-Based Specification Language for C++ Classes", Technical Report TR94-02b, Iowa State University Department of Computer Science (Nov. 18, 1994), 52 pages.
Zhou et al., "AccMon: Automatically Detecting Memory-Related Bugs via Program Counter-Based Invariants," Proceedings of 37th International Symposium on Micro-Architecture (MICRO) (Dec. 2004).
Zilles et al., "A Programmable Co-processor for Profiling", Proceedings of the 7th International Symposium on High Performance Architecture (Jan. 2001), 12 pages.
Zorn et al., "A Memory Allocation Profiler for C and Lisp Programs," published Feb. 16, 1988, pp. 1-18.

* cited by examiner

USING DYNAMIC ANALYSIS TO IMPROVE MODEL CHECKING

TECHNICAL FIELD

This invention relates to program verification, and more specifically, using dynamic analysis to improve model checking.

BACKGROUND

Model checking has been used to verify program behavior. For example, a tool takes a device driver program and builds a Boolean program and an associated model, and exhaustively tests the model according to certain properties (e.g., predicates) defined in a specification. If the predicates are not violated during state exploration of the model, then the driver is deemed verified for that specification. Verification involves testing the driver for all possible inputs. The analysis is conducted symbolically on the Boolean model of the driver, as opposed to the driver itself. A user provides a specification such as a set of predicates that they would like to be checked or verified on the program. A specification includes one or more predicates that verify certain properties. For example, if a driver acquires a lock on a resource, it should release the lock. However, exploration of the model is often impractical for many general purpose programs due to the complexity of an exploding state space.

SUMMARY

A program is instrumented with code that records pointer dereference information. The instrumented program is executed thereby recording pointer dereference frequency information. Then, a model of the program is explored using the pointer dereference frequency information to direct state space exploration of the model. Pointer dereference information is stored in a two level data structure wherein a first level of the data structure indexes the high order bits of the memory location and the second level of the data structure indexes the low order bits of the memory location.

In one example, upon a failure of exploring the model using static pointer analysis information, a subset of state space is explored with dynamic highest frequency points-to information. In one such example, ranked sets of frequency information are applied to guide exploring the model. The state space exploration of the model often locates a bug in the program.

In another example, pointer dereference frequency information is recorded in a data structure indexed by memory locations. Typically, each pointer dereference provides a unique mapping from the numeric value of a pointer to the object it refers to, because only one object resides at a memory location. In one such example, the code that records pointer dereference information instruments pointers at locations where they are dereferenced for writing. Often, the locations where pointers are dereferenced for writing are those binary instructions that load or store via an indirect address.

In another example, the program is instrumented with code that records pointer dereference information separately for each dereference site. In another example, the dereferences are counted separately for each dereference site, and sampling is provided at a rate that decreases geometrically.

In one example, the model is explored iteratively from highest to lowest pointer dereference frequency. In such an example, each time a next lowest frequency is added during iteration, the model is explored using the next lowest frequency in combination with the higher frequencies. If desirable, after dynamically determined frequency information is explored, the model is further explored using traditional static points-to sets.

In one example, recording pointer dereference frequency information includes writing memory dereference information to a trace file and automatically evaluating the trace file to identify and count pointer dereferences. In another example, recording pointer dereference frequency information includes counting pointer dereferences as the instrumented program executes. If desirable, instrumenting the program with code includes adding calls to a dynamic linked library (DLL), and recording pointer dereference frequency information includes executing identifying and counting logic in the DLL.

Additional features and advantages will be made apparent from the following detailed description of the illustrated embodiment which proceeds with reference to the accompanying drawings.

DETAILED DESCRIPTION

In the following detailed description, using dynamic analysis to improve model checking is discussed with the following associated drawings.

Overview

Model checking has been used to find bugs in software programs. For example, a static driver verifier (SDV) is a tool that is shipped by Microsoft Corporation that verifies the behavior of device drivers. Additionally, various other tools use model checking to verify program behavior. In one example, a tool takes a program and builds a Boolean program and an associated model. The tool then exhaustively tests the model according to properties (e.g., predicates) defined in a specification. If the predicates are not violated during state exploration of the model, then the program is deemed verified for that specification. Verification involves testing a program for all possible inputs. The analysis is conducted symbolically on the model of the program, as opposed to the program itself.

A model checking tool explores the state space of the model thereby providing certain guarantees. For example, one possible guarantee provides that there is no inputs that will cause a verified driver to fail.

The tool converts a program (such as a device driver) into a Boolean program and constructs a model from the Boolean program. A user provides a specification such as a set of predicates that they would like to be checked or verified on the program. For example, a specification can include a predicate that verifies that if a driver acquires a lock on a resource, it releases the lock. Or, whenever a pointer is accessed, it is never null. Or, a given variable is never negative. These properties can also be conditions (such as pre-conditions or post-conditions) that should hold on various parts of the program (such as procedures, methods, objects, etc).

Then, through a process called abstraction refinement, the state space of the model is explored symbolically. During exploration of the symbolic state space of the model, the tool looks for a violation of one of the properties of the specification. For example, state space exploration can be a reachability analysis, such as exploring a graph of reachable nodes of the model. During state exploration of the model, if a possible path or condition of the model violates a property of the specification, then the violation is considered for refinement. Since the error was identified on the model and not the program itself, the error (or counterexample) may not be real. Thus, the tool attempts to refine the model to rule out such false errors. For example, the tool looks for a condition in the state space of the model that would indicate the error is not real. For example, in a symbolic trace of a path through reachable nodes of the model, a previous condition of the model may already have ruled out the possibility of the counterexample. In such a case, the model is refined to rule out the counterexample. For example, a condition is placed on that path to rule out or limit the condition or assignment that would otherwise cause the error.

The tool continues iterating through the model, and refining any counterexamples where possible. Once the model has been symbolically explored and no other counterexamples exist that can not be refined, then the program is deemed verified for that specification.

In one example, when a counterexample is identified in a program, a theorem prover is used to identify a condition along the path that provides a refining condition for the model. Thus, a theorem prover may be used to help refine the model.

If a counter example is identified in the model that can not be refined, it can be reported to the user/tester as a bug, and/or a program may fail verification.

Device drivers have a relatively small state space as compared to many general purpose programs. Thus, programs such as device drivers provide a manageable state space for program verification. Additionally, programs such as Prefast and Prefix are often used to identify more apparent bugs before using a model checker tool. This helps reduce the complexity of the program considered by the model checker tool.

Programs often have pointer dereferences. Prior model exploration systems used static pointer analysis to determine where pointers point. If for example, a program statement assigns a value to a memory location (*p:=5), static pointer analysis would need to determine where in memory that pointer points. If at various points in the static analysis of a program, "p" points-to three different memory locations (e.g., set $\{a, b, c\}$), static pointer analysis requires considering all three cases. Thus, static pointer analysis would split state space into three cases, which multiplies the state space by three. If one of those three state spaces splits into another five possible memory locations, then that state space is multiplied by five. The state space explosion quickly becomes unmanageable for general purpose program testing using static pointer analysis since a model checker attempts exploring all these paths (points-to cases) before making a test determination or verification.

However, when a program executes, it is more typical for a pointer to point-to a subset of the memory locations determined during static points-to analysis. One of the goals of the described technology is to provide more precise pointer information to the model exploration program. The semantics of a Boolean program may be expressed by predicate transformation. For instance, for a statement S and a predicate P2 that holds after its execution, the semantics give a weakest precondition P1 describing all states before execution that could give rise to the post-condition. This relation is written "$\{P1\}S\{P2\}$". Such semantics are relatively concise without pointers; for instance for a simple assignment statement, $\{y=5\}x:=y\{x=5\}$.

However the presence of pointer operations makes such semantics more complicated, as for the following indirect pointer assignment, $\{(y=5 \wedge p=\&x) \vee (x=5 \wedge p \neq \&x)\}*p:=y\{x=5\}$.

Thus, static pointers analysis suffers from an exploding state space and more difficult predicate analysis. Typically, with general purpose programs, aliasing of pointed-to nodes is observed quite often in static pointer analysis, resulting in an exploding state space. Static points-to analysis builds a points-to graph upon analysis of the program. Nodes represent variables, and edges connect pointer variables to the pointers they might point to.

Existing model checkers are unable to explore the state space of some programs because of an exploding state space caused by aliasing of pointed-to nodes. It would be desirable to find program bugs in cases when existing model checkers are unable to explore an exploding state space. In order to provide information about bugs in cases of an unmanageable state space, information about dynamic analysis of the program is provided to the tool. The model checking is augmented with points-to frequency information obtained from instrumenting and running the program.

An instrumented version of the program is run, and each time a pointer dereference occurs, it is noted. The first time a memory location is dereferenced, it is noted and counted, and subsequent dereferences to that location are counted. Thus, this dynamic pointer analysis provides points-to dereference information along with frequency information on a per dereferenced site basis. For example, the dynamic points-to analysis may indicate that a pointer dereference "p" points to three memory locations during a program run, and the frequency of each location. For example, the results may indicate that "p" points to a, 300 times, to b, 50 times, and to c, 3 times. In this example, "a" is the highest frequency node pointed-to by p, "c" is the second highest frequency node pointed-to by p, etc. By contrast, while static pointer analysis may point to plural different variables, no information about frequency of visits to memory locations is provided during model exploration using static pointer analysis.

This frequency information is useful to overcome exploding state spaces. For example, during exploration of the state space of the model, the model checker can use the dynamic pointer analysis frequency information to identify state space exploration of the highest frequented nodes. For example, upon failure of model checking using static pointer analysis due to an exploded state space, a subset of the state space can be explored with the highest frequency points-to information. Or, even without failure of the static analysis, this points-to information can be used to provide an efficient order of exploring the state space.

Example Software Testing Environment

Figure 1:
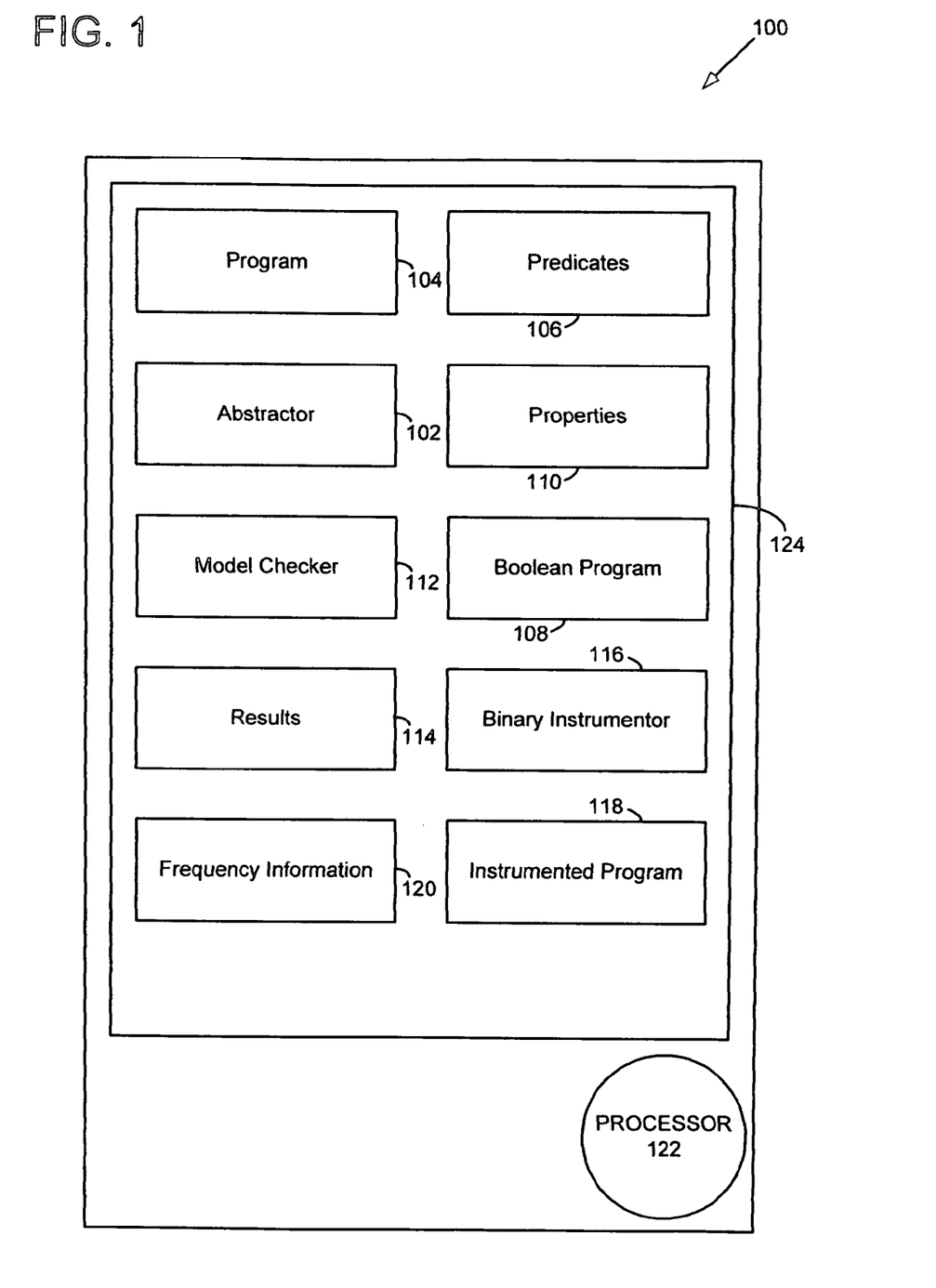
FIG. 1 is a block diagram illustrating an exemplary environment using dynamic analysis to improve model checking.

FIG. 1 is a block diagram illustrating an exemplary environment for practicing the described technology. The exemplary environment 100 is a software testing environment. One goal of this software testing environment is to determine whether a program 104 will operate properly. In one example, the software testing environment 100 includes a processor 122 that executes various software components 124 including an abstractor 102 and a model checker 112. The abstractor 102 takes a program 104 as input. The program 104 may be written using any high-level programming language, any industrial programming language, and the like (e.g., "C" programming language). The abstractor 102 also receives a specification such as a set of predicates 106. Predicates 106 define relationships between program variables that will be tracked in the program 104. Predicates 106 are Boolean expressions.

The abstractor 102 automatically generates a Boolean program 108 based on the program 104 and the predicates 106. Thus, the Boolean program 108 is the predicate abstraction of the program 104 with reference to the predicates 106. If desirable, the Boolean program 108 has a similar control-flow structure as program 104. Code statements in the program 104 typically have corresponding predicate statements in the Boolean program 108. The code statements include procedure calls, assignments, gotos, conditionals and the like. The Boolean program 108 generated is an abstraction of program 104 because the set of symbolic execution traces of the Boolean program 108 is a superset of the set of execution traces of the program 104. Not all of the abstract 108 traces will be concrete 104 traces in general, but every concrete trace has a corresponding abstract trace, which is how the behavior of program 104 is tested.

Therefore, any tool that tests the operation of the Boolean program 108, is also testing the behavior of the program 104. One such tool is model checker 112.

A model checker 112 receives the Boolean program 208 and a list of properties 110. For predicate statements in the Boolean program 108, the model checker 112 computes a set of reachable states. In one embodiment, the model checker 212 implements an inter-procedural dataflow analysis process. An illustrative inter-procedural dataflow analysis process may be based on the inter-procedural dataflow analysis algorithm described in the book entitled "Program Flow Analysis: Theory and Applications", by M. Sharir and A. Pnueli, pages 189-233, Prentice-Hall, 1981, and in the article entitled "Precise Interprecedural Dataflow Analysis via Graph Reachability", by T. Reps, S. Horwitz, and M. Sagiv, pages 49-61, Conference Record of POPL'95: 22nd ACM SIGPLAN-SIGACT Symposium on Principles of Programming Languages, 1995.

While the details of the model checker 112 are not necessary for an understanding of the present invention, a brief overview of one exemplary model checker 112 provides insight into the significance of dynamic pointer analysis. In general, model checker 112 updates Boolean variables (not shown) that are in scope at statement S'. The model checker 112 then computes a set of reachable states for each statement S' of the Boolean program 108 based on the Boolean variables in scope. The model checker 112 then outputs results 114.

Results 114 may include invariants representing the reachable states at any particular point of the Boolean program 108. These invariants may be used for many different purposes, such as to refine alias information for pointers. The results 114, thus, provide insight into the invariant state of the program 104 at a corresponding point. See U.S. Patent Publication No. 2005/0235257 A1, published Oct. 20, 2005, U.S. Patent Publication No. 2005/0149904 A1, published Jul. 7, 2005, U.S. Patent Publication No. 2005/0086648 A1, published Apr. 21, 2005, all three publications are incorporated herein by reference thereto.

During exploration by the model checker, the complexity may exceed the resources of the computing environment. In order to overcome the complexity of the exploding state space, dynamic pointer dereference information is provided to the model checker to reduce the complexity of the state space exploration.

A binary instrumentor 116, instruments the program 104 with logic for gathering information about dynamic pointer dereferences. The instrumented program 118 executes thereby causing the instrumented logic to dynamically gather information 120 about pointer dereferences made by the instrumented program at runtime. For example, the frequency information includes information about which pointers were dereferenced at runtime, and how many times each pointer site was dereferenced. The model checker uses this frequency information to explore the state space of the Boolean program using pointer dereferences with highest frequency. Focusing the state space exploration starting with this highest frequency pointer dereference information, helps identify bugs in the program, that could not otherwise have been identified with points-to information obtained from prior static points-to analysis.

Method of Using Dynamic Points-to Information to Explore a Model

Figure 2:
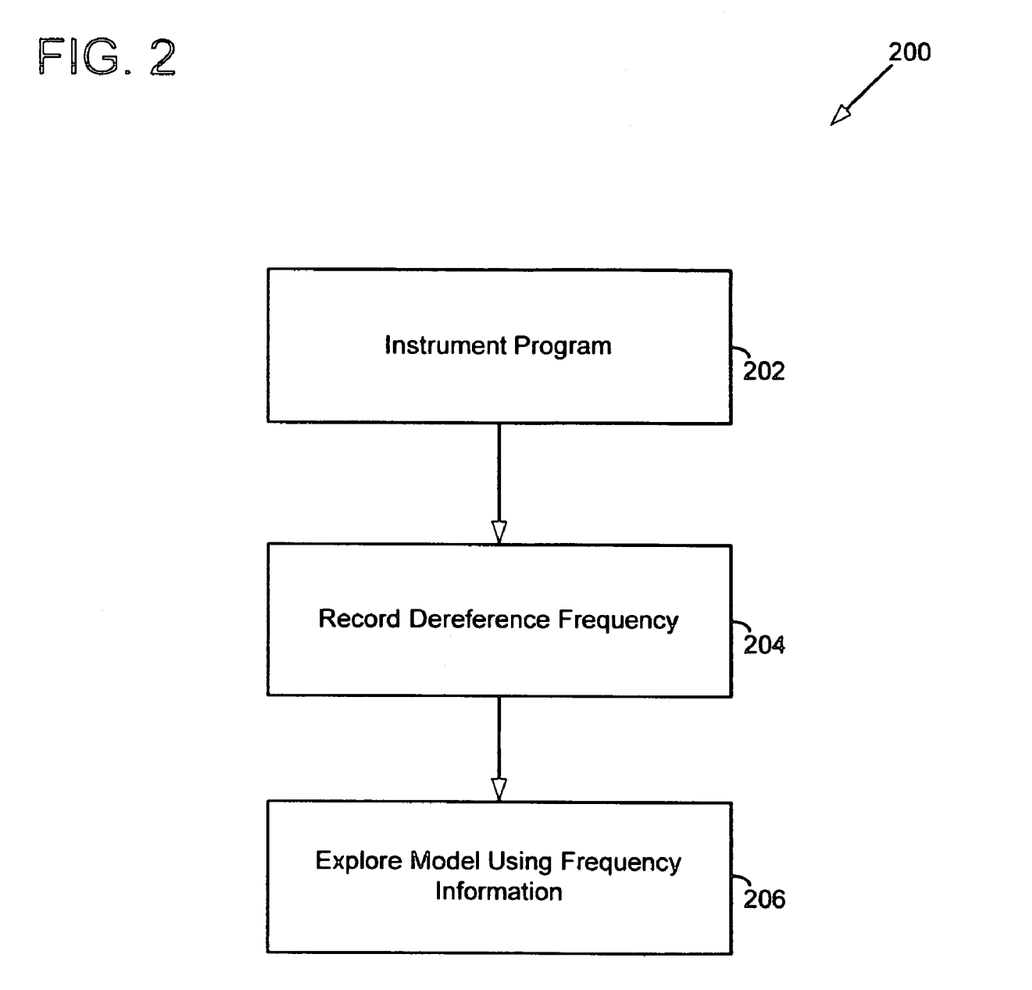
FIG. 2 is a flow chart of a method using dynamic analysis to identify pointer dereference information.

FIG. 2 is a flow chart of a method using dynamic analysis to identify pointer dereference information. The method 200 can be implemented by a tool testing or verifying program behavior.

At 202, the method instruments a program with code that records pointer dereference information.

At 204, the method executes the instrumented program and records pointer dereference frequency information.

At 206, the method explores a model of the program using the pointer dereference frequency information to direct state space exploration of the model.

Optionally, the method performs other functions. Pointer dereference information can be stored in a two level data structure wherein a first level of the data structure indexes the low order bits of the memory location and the second level of the data structure indexes the high order bits of the memory location.

In one example, upon a failure of exploring the model using static pointer analysis information, a subset of state space is explored with dynamic highest frequency points-to information. In one such example, ranked sets of frequency information are applied to guide exploring the model. The state space exploration of the model often locates a bug in the program.

In another example, pointer dereference frequency information is recorded in a data structure indexed by memory locations. The fact that only one object can exist in a memory location at a time is a fundamental one, and the ability of pointer values to uniquely identify an object is a consequence of this fact. Thus, each pointer dereference provides a unique mapping from the numeric value of a pointer to the object it refers to. In one such example, the code that records pointer dereference information instruments pointers at locations where they are dereferenced for writing. Often, the locations where pointers are dereferenced for writing are those binary instructions that load or store via an indirect address.

In another example, the program is instrumented with code that records pointer dereference information separately for each dereference site. In another example, the dereferences are counted separately for each dereference site, and sampling is provided at a rate that decreases geometrically.

In one example, the model is explored iteratively from highest to lowest pointer dereference frequency. In such an example, each time a next lowest frequency is added during iteration, the model is explored using the next lowest frequency in combination with the higher frequencies. If desirable, after dynamically determined frequency information is explored, the model is further explored using traditional static points-to set.

In one example, recording pointer dereference frequency information includes writing memory dereference information to a trace file and automatically evaluating the trace file to identify and count pointer dereferences. In another example, recording pointer dereference frequency information includes counting pointer dereferences as the instrumented program executes. If desirable, instrumenting the program with code includes adding calls to a dynamic linked library, and recording pointer dereference frequency information includes executing identifying and counting logic in the dynamic linked library.

Using Dynamic Points-to Sets to Improve Model Checking

Many program analysis techniques require information about what objects the references in a program might point to. Most commonly, this information is obtained using a conservative static analysis that is guaranteed to find all the objects a reference might point to, but this often finds points-to relationships that could not occur during real executions.

For many applications, though, a more useful kind of information is a ranked list of what objects in memory a pointer dereference is most likely to point-to. This technology shows how to obtain such ranked points-to sets via a dynamic approach that examines real executions. Additionally, statistical sampling significantly reduces the overhead imposed by the dynamic sampling technique without sacrificing accuracy, and the resulting points-to sets are much more precise than those from a comparable static analysis.

These ranked sets are applied to guide the search of a model checker used to located bugs in programs such as device drivers. Further, this more precise points-to information allows a tool to find the same number of bugs in a shorter execution time.

Just as a static analysis can be considered an abstract interpreter that replaces some program operations with simpler ones, a dynamic analysis is more in the form of an augmented interpreter which collects additional information while the program executes normally. For dynamic points-to analysis, this additional information consists of the identity of the pointed-to object. Conceptually, this information is initialized when a pointer is created, and associated with the pointer value as it is operated on and copied during execution. Maintaining such information for each pointer value and operating on it in parallel with a programs original operations would potentially be rather expensive, for instance because there likely will not be enough registers to store identity information in a register along with each of the original program's registers.

However, because only one object can reside at a memory location at once, pointers have the convenient property that there is a unique mapping from the numeric value of a pointer to the object it refers to. Thus, instead of tracking pointer identities through pointer operations, it suffices to track which objects occupy which areas of memory as objects are created and destroyed. To determine what object a reference points to, the analysis checks which object currently resides at the pointed-to memory location. Besides requiring fewer operations to be instrumented, this technique also does not need to perform any approximations to account for potentially unsafe operations such as arbitrary pointer arithmetic or references to out-of-scope local variables, because the identity of pointer values always matches the object that a pointer access would really affect.

The generic algorithm described above can be instantiated by giving a specific definition for which memory regions constitute "objects", and specifying when pointer values should be recorded. One implementation takes objects to be global and local variables, and optionally identifies memory allocated on the heap by allocation functions (e.g., malloc) and similar functions.

In one example, objects representing variables are named after the variable (qualified by the function name for local variables including function parameters) while heap blocks are labeled by the source location of the allocation cell. When an object comes into existence (at program start for globals, on function entrance for locals, or at allocation time for heap blocks) the instrumented code marks that area of memory with the object's name, and stores the object name and memory location information in a separate data structure. This data structure is then used to count the number of times an object is accessed by the running program.

Conversely, when objects go out of existence the information about them can be erased; except for debugging purposes this is not necessary. Unless the program being instrumented is faulty, it will not access unallocated objects, so it is sufficient to let the identity information be overwritten when an area of memory is reused.

The instrumented code records the values of pointers at the locations where they are used (dereferenced, for either reading or writing), since these are the points where their values affect the rest of program execution. At the machine-code level, these are exactly those instructions that load or store via an indirect address (one formed from values in registers). Direct-addressed instructions (those that specify a literal address) and accesses of the stack at a fixed offset correspond to direct uses of global and local variables. The tool does not track these because the object being accessed is specified directly in the code.

The set of pointed-to objects is maintained separately for each dereference site, including different uses of the same pointer variable; in the terminology of static analysis, this makes the approach flow sensitive. The analysis is context insensitive, in the sense that it does not distinguish sites based on the functions calling the function where the dereference occurs, but this does not mean it suffers from all of the imprecision of a context-insensitive static analysis, because the execution of the program itself still respects the calling context.

Statistical Sampling

Empirical results show that the average dereference site will be executed many times, but with relatively few unique pointed-to object identities, or pointees. A "pointee" refers to the name that appears inside points-to sets. In one such example, the name that appears inside points-to sets are either the names of variables or the code locations of allocations. The application of the points-to information often requires only the relative frequency of various pointees, so maintaining the exact usage counts for each pointee, may not be necessary. Specifically, there is a diminishing value for each observation at a given dereference site, since most samples confirm an already established distribution relationship.

On the other hand, if a dereference site is executed only a few times, the analysis might as well record them all, since keeping just a few is inexpensive, and each one makes a large contribution to the final distribution. An ideal sampling strategy would collect a fixed number of samples, such as 10 to 100 per site. However, this strategy cannot be implemented directly, because it is difficult to predict how many more times a site will be executed when it is first seen.

Instead, a tool uses a technique in which the sampling rate decreases geometrically, so that the number of samples per site is logarithmic in the number of executions. The logarithm is chosen with a small base (just slightly more than 1), so that the number of samples taken is often in the target range of 10-100 mentioned previously.

Changing the sampling rate over time introduces a bias, in that pointees used at the beginning of execution are more likely to be recorded. This bias is in fact helpful in increasing the number of unique pointees seen, because special objects are often used during program initialization. However, to minimize the effect of the bias on the relative frequencies of the pointees, the tool weights the samples proportionally to the inverse of the sampling rate in effect when they were observed. In other words, each sample taken stands in for the adjacent skipped executions. Some other techniques are required to perform the sampling efficiently. To avoid having to pick a random number at each dereference, the instrumentation code instead computes a value that represents the number of occurrences to skip before counting the next one. In the case where no sample is taken, all the added code has to do is decrement this value.

If the tool always used the same countdown value each time, the samples would be periodic (for instance, it would never sample for the same site two executions in a row). Instead, if it is be desirable for every potential sample to be collected with the same probability independent of any others, the tool (or instrumented code) picks the countdown values from an exponential distribution chosen so as to simulate this independence. These countdown techniques are similar to a prior technique. See e.g., Liblit et al., Distributed Program Sampling, 2003 ("Liblit"). However, in Liblit, the tool uses a single global countdown to implement uniform sampling, while the present one uses per-site countdowns to adapt to the differing execution counts at various sites. Additionally, to further save work at runtime, the tool precomputes a "schedule" of countdown values at instrumentation time. Since the length of the schedule needed is logarithmic in the program runtime, there is no danger of it running out. The weighting described above can be achieved simply by using the next countdown value as the weight for the current sample.

Varying the sampling rate (by varying the length of the sampling schedules) provides a trade-off between correctness and efficiency. Results show that overall, the trade-off is quite favorable. For example, efficiency is increased by a factor of 2 or more, while the results remain around 99% correct.

Iterative Deepening

Previously, model checking (exploration) using static pointer analysis information provided program verification, assuming the analysis was able to complete before state space explosion halted the analysis. In order to provide testing completeness closer to verification, an iterative deepening scheme is used. The dynamic pointer analysis (DPA) provides a list of pointed-to memory locations along with frequency information. The iterative deepening scheme starts with the memory location with the highest frequency and model checks limiting the points-to graph for each pointer to its highest frequency memory location. Interestingly, if a bug is found using this dynamic frequency points to information, it is a real bug. It is a real bug since that memory location was identified by a dynamic run of the program. Next, the iterative deepening scheme runs model checks limiting the points-to graph for each pointer to its two highest frequency memory locations. And at each iteration, any counterexamples are refined through abstraction refinement of the model. If desirable, the model is explored by iteratively adding pointees, from highest to lowest frequency. Each time a next lowest frequency pointee is added during iteration, the model is explored in combination with the higher frequency pointees. This provides checking of combinations of pointees that pointers can point to. This provides interactions of behavior that can not be reached by one pointee at a time. This can be compared to a combinatorial explosion.

If desirable, after all the dynamically determined frequency information is explored, the model checker can then turn to explore the traditional "static points-to set" (SPS) which will possibly include more pointers not indicated in DPA, and also additional memory locations for one or more pointers not visited or discovered in the DPA.

As before, if the state space explosion is going to exceed computing resources, it may occur during this last step of SPS model exploration. However, with the iterative deepening scheme, bugs that that would never have been discovered using the prior method, are identified before the state explosion in the last SPS step.

Thus, even though the iterative deepening scheme is doing more work over-all, first with DPA and then iterative deepening, by waiting until the final step to explore the SPS, its often does not introduce enough complexity to cause state explosion. For example, if the prior SPS model exploration did not cause debilitating state explosion that ended the analysis, then iterative deepening also will not cause debilitating state explosion. But if the SPS model would have caused debilitating state explosion, then at least iterative deepening will find bugs along the way. Thus, although iterative deepening can not be said to be sound (unless a method completes with SPS state exploration), it finds bugs along the way when the prior method often provides nothing. Further, any bugs found during iterative deepening are real bugs.

Dynamic pointer analysis involves instrumenting the program itself (as opposed to the model) and running the instrumented program version (IPV) with one or more actual inputs. Running the IPV on multiple sets of inputs and accumulating frequency over the multiple runs provides even more diverse frequency information for the points-to sets. The instrumentation records what memory locations are pointed to and the frequency for each memory location. You can run the IPV on one, or one thousand input sets, and collect frequency information. For pointers (and or memory locations of a pointer) with no (collected) frequency information, the static points-to information can be used during model exploration. For pointers with collected frequency information, the analysis can focus on one or more of the highest frequencies as desired or indicated by the (human and/or tool) tester.

In one example, predicates of the specification are model checked based only on state exploration with the highest frequency points-to set determined during DPA. If no bugs are found, the model exploration continues with the two highest frequencies, then the three highest frequencies; and this may continue until the dynamic points-to set is exhausted. Model exploration can be conducted with only the traditional static pointer analysis points-to set, or can be augmented with the DPA information.

There is an important connection between the choice of levels of dynamic points-to information and the total running time of the iterative deepening process. If the sizes of the points-to sets are increased slowly, iterative deepening could require much more model checking time than a single run with the largest points-to sets. On the other hand, if the points-to sets are the cause of the model checker's state space explosion, and the points-to set sizes are increased according to this exponential growth, the total running time for iterative deepening cannot be much more than a single large run.

For instance, suppose that the rate of adding points-to sets causes the run time of the model checker to double upon each iteration: then the total run time of the repeated process will be less than twice as long as the final run with the largest sets.

Dynamic Points-to Analysis

A program can be instrumented to provide dynamic information about pointer dereferences. A program may have pointer dereferences at various program levels or scopes. It may be desirable to acquire dynamic pointer dereferences of global variables, local variables, stack variables, heap variables, etc. Stack variables and global variables can be identified and counted based on variable name. Heap variables may not have a unique name but may be counted, for example, based on allocation site or memory location. There are different classes of pointer analysis which provide various information, and some classes scale better than others. In one case, a flow sensitive analysis is used in dynamic pointer analysis. Flow sensitive analysis can be considered in view of the following program of Table A.

TABLE A

| | |
|---|---|
| a := 3; | //assign value |
| p := &a; | //make pointer "p" point to variable "a" |
| *p := 4; | //dereference "p" and write to "a" |
| a := 2; | //assign value |
| p := &b; | //make pointer "p" point to variable "a" |
| *p := 5; | //dereference "p" and write to "b" |

Static pointer analysis is often flow insensitive, meaning that it would note that "p" may point to two memory locations but not in any particular order. This provides a more efficient pointer analysis since no information is required indicating the temporal relationship of pointer dereferences. However, the described dynamic pointer analysis indicates what memory location "p" points to and also the frequency information, for example, based on a per pointer dereference location. Thus, in the described DPA, the frequency information is flow sensitive.

Additionally, in another example, the described DPA is context insensitive. Context insensitive analysis can be considered in view of the following program of Table B.

TABLE B

| | |
|---|---|
| ... | |
| p := &a; | |
| Foo (p); | //where Foo called from |
| ... | |
| p := &b; | |
| Foo (p) | |

Context insensitive provides that inside some procedure Foo, if a pointer "p" is dereferenced, the pointer analysis does not consider from where Foo was called. In one such example, the described instrumentation just stores the memory address of the dereference and a count of the dereferences, on a per pointee basis. For purposes of frequency for ranking of model exploration this was efficient. However, another embodiment could also store "from where" Foo is called.

Another design consideration was whether to instrument with write statements, thereby writing to a trace file, all memory dereferences. The trace file could then be automatically evaluated after run time, to identify and count the frequency information. The option selected was to instead instrument with instructions that identify and count pointer dereferences on-the-fly, as the instrumented program executes. Either writing to a trace file or counting on-the-fly could be employed to gather the information.

Binary Rewriting

The binary code of the program under test is rewritten (instrumented) ahead of time to include statements that identify and count pointer dereferences. A binary instrumentation program, such as Vulcan from Microsoft Corporation, identifies pointer dereferences in the binary code and rewrites the binary code with calls to the frequency counting DLL. In this example, an instrumentation program reads the binary file and locates binary instructions that are pointer dereferences. Table C is an example of instrumentation code segments (in human readable form) placed in front of pointer dereferences, for calling a frequency counting dynamic link library with the dereference information.

TABLE C

| | |
|---|---|
| a := 3; | //assign value |
| p := &a; | //make pointer "p" point to variable "a" |
| frequency.record(p); | //first pointer dereference record |
| *p := 4; | //dereference "p" and write to "a" |
| a := 2; | //assign value |
| p := &b; | //make pointer "p" point to variable "a" |
| frequency.record(p); | //second pointer dereference record |
| *p := 5; | //dereference "p" and write to "b" |

In this example, a call to "record" at a frequency counting DLL, records that "p" pointed to memory location "a" at the first record call, and that "p" points to "b" at the second record call. In one example, each pointer dereference (not just p) of the program is instrumented with a record statement, and during run time, the pointer dereference is counted by the frequency logic in the DLL. During program execution of one or more input sets to the instrumented program, the frequency information is recorded.

Efficiency Considerations

A general purpose program often has many (possibly thousands), of such pointer dereferences. In such example, each such pointer dereference includes a call to the frequency DLL. When the DLL receives the call, it identifies the memory location and counts the pointer dereference. For example, for global and local variables, the frequency logic looks up a unique name of the dereferenced variable. For heap variables, since there is often no unique names or tokens assigned to the variables, a pointer dereference of a heap variable is identified by its memory location on the heap.

When a call is made to the frequency logic (e.g., DLL), the unique identifier or memory location (i.e., pointer identifier) is looked-up in the DLL. If a pointer identifier is present, it is counted. If a pointer identifier is not present, then it is the first dereference for that pointer identifier. Thus, on a first dereference, the pointer identifier is added to a data structure and counted. On a second and subsequent dereference, that pointer identifier is in the data structure and is counted. Of course, the frequency logic can also be placed in the instrumented binary code (instead of a separate DLL), and this is a question of efficient design based on memory structure and processing resources.

If a pointer points-to a particular site (e.g., pointee, node, object, memory location, etc.) on the heap, it is likely to continue to do so. Thus, getting more information about hundreds of visits to that pointee is useful for frequency comparison, but does not add any new information about a pointed-to memory location. It is preferable to record new points-to information, and after that it becomes a question of the granularity of desired information. Reducing the number of calls to a frequency DLL can increase the efficiency of the profiled instrumented program. In one example, a decreasing sampling rate is provided. Table D is an example of instrumentation code segments (in human readable form) placed in front of pointer dereferences sites, that provides a reduced rate of sampling a dereference site "p".

TABLE D

```
initialize global variable count-p : = 1; //
...
count-p := count-p − 1;
if (count-p == 0)
{
    frequency.record(p); //decreasing dereference record
    count-p := 10;
}
*p := 4;
```

The above counting logic, inserted in front of the pointer dereference of "P", calls the frequency logic on the first pointer dereference of p, and then on every tenth dereference of p. This reduces the profiling costs of counting dereferences on a per dereference site basis but still maintains relative frequency information. For example, if the above pointer dereference calls the frequency logic 25 times, then p was dereferenced at this location about 250 times, and the logic always gets the first dereference of p since count-p is initialized to 1.

Thus, various logic can be implemented that counts the first few accesses and then simply counts at various rates or decreasing rates. Interestingly, if the same counter logic is used at multiple (possibly all) dereference sites, then the frequency information will remain relative among plural sites. Thus, each dereference site would provide an independent sampling rate. So the site counter maintains a count and decides when to call the frequency logic. Since the expensive part is making a call to the DLL, so that is minimized while honoring a desired granularity of sampling that remains relative between sampling sites.

In another example, the counting logic samples pointer dereferences at a decreasing rate, such as a geometrically decreasing rate. For example, a counter may call the frequency logic each time it reaches zero, and then double the start size of the counter (e.g., 1, 2, 4, 8, etc.) Other counting schemes are imaginable to one of ordinary skill in the art upon reading this concept.

Storing Dynamic Points-to Information

When the frequency logic is called with information about an object or a pointer dereference it is stored in a data structure. For an object, the information contains the location of the object and a name for it; for a pointer dereference, it identifies the dereference site and gives the value of the pointer.

In one example, a table data structure is used to store the name of the object that resides at each address and has one entry for each address occupied by an object. When an object is created, entries are added to the table, and when it is deleted, they are removed.

Figure 3:
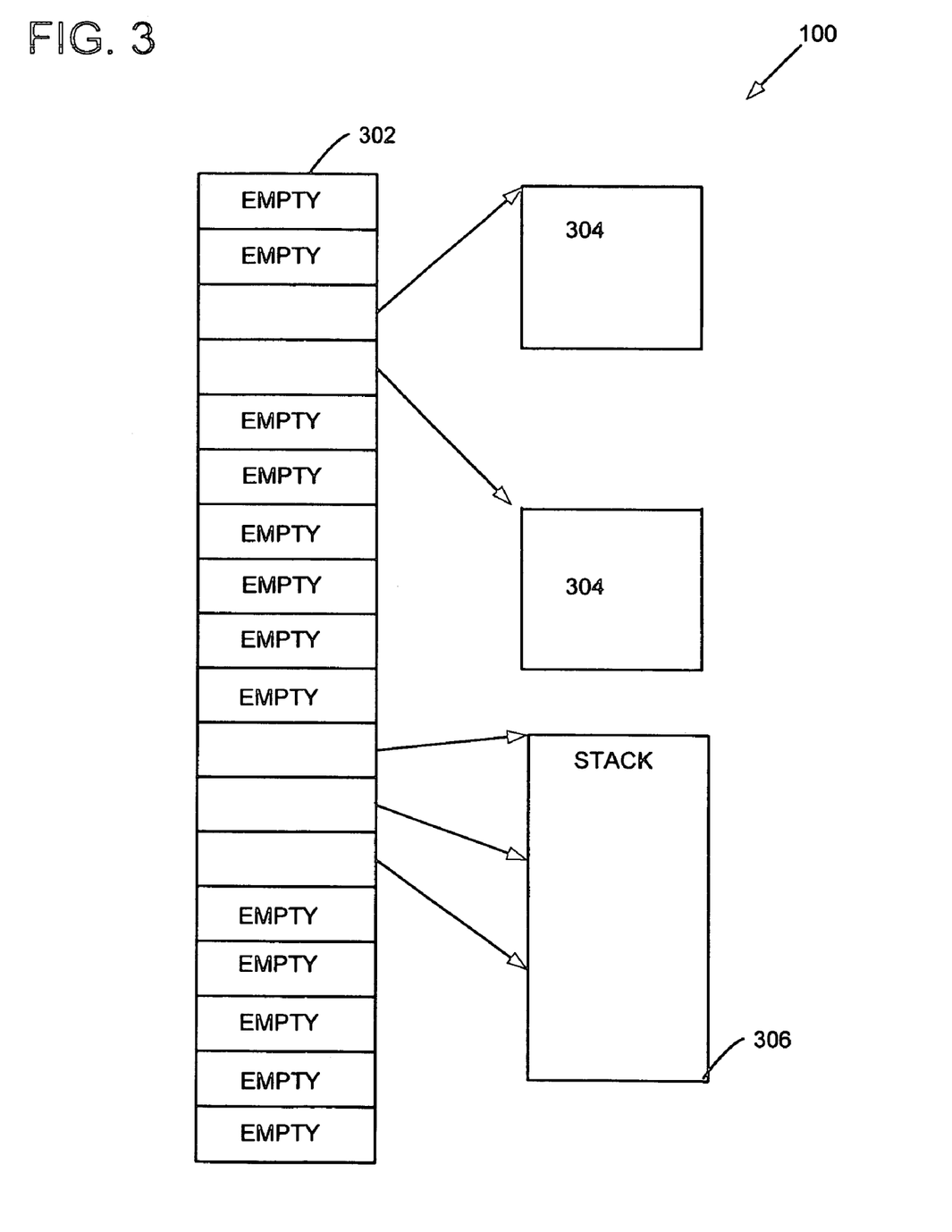
FIG. 3 is a block diagram of a two-level data structure storing dynamic points-to information.

FIG. 3 is a block diagram of a two-level data structure storing object identity information. A two level table data structure 300 provides efficiencies in identifying an object by memory location. Potentially, such a table might need to record information about the contents of any memory address, but the table must be stored within the same memory, so some form of compaction is needed. On the other hand, the table is accessed frequently, so operations in it should be efficient. One way to balance these goals is to take advantage of the fact that memory accesses are often adjacent, so that the addresses share the same higher order bits. Thus, in this two level table scheme, the first level 302 of the table indexes the high order bits, and the second level 304 of the table indexes the low order bits of the memory address. Because most programs do not use most of the available address space, most entries in the first level 302 of the table will remain empty, and the corresponding second level tables 304 unallocated. For addresses that are used, however, the second level tables 304 retain the locality properties of the original memory accesses, and each access requires only a few machine instructions.

Another efficiency is to provide a separate table (or area in the table) for the memory locations that hold the program stack 306. Entries describing local variables stored on the stack are frequently created and deleted as procedures are executed, so it is important that modifications of such entries be efficient. Such optimization is possible because local variables are stored at predictable addresses, which vary only depending on the value of the stack pointer. Thus for writing purposes, the contents of the stack can be represented by a contiguous region; but for uniformity of reading, this contiguous area may be references from the same first level table 302.

In another example, there are two important data structures in a system; a first structure stores an object name for each address, and a second structure stores a set of object names for each dereference site (i.e., code address). The two-level table of FIG. 3 is an example of the first structure. The second structure is the one that gets incremented when pointer dereferences occur.

In one example, these tables are placed in or accessible via the frequency DLL. Thus a call to the frequency DLL results in a mapping back to a frequency information data structure, such as one or more tables. Of course, the data may also be recorded in a linked list, array, or other data structure.

Additionally, when a call is made to the frequency DLL, execution may alter one or more of the bits in the status register of the processor. Traditionally, the status register is saved in a context switch when the call is made. As a further efficiency, the program instructions of the frequency logic can be selected so that will not alter bits in the status register. This efficiency allows not having to save and restore context, such as the status register. Thus, the instrumentation is designed or selected so it does not affect the status register flags. In one such example, a set of instructions are selected because they guarantee to leave the status flags unchanged, or to return them to their prior state.

Comparison with Static Analysis

Static pointer analysis treats the heap as binary large object (BLOB) because it has no runtime allocation or access information to distinguish one variable from another. However, during dynamic pointer analysis this heap information can be obtained using an instrumented version of the program. Static pointer analysis requires splitting the state space whenever the heap is accessed in an indeterminate way. By breaking pointer dereferences into per dereference sites, it can be determined where a pointer is really calling for one or more program executions. This avoids the exploding state space.

This approach measures distributions. For example, static analysis may determine that a pointer may point-to plural locations. But it can not determine any frequency information. Interestingly, empirical results show that the distribution of pointed-to locations is quite skewed. Given a pointer "p", that points to memory locations a, b, and c, it is typically the case, that p will to one of the locations much more often then the other. For example, in a run of various benchmarks, these skewed results were confirmed. In one example, for about 93% of the pointer dereference sites in a program, a single pointed-to variable accounted for at least 90% percent of observed dereferences. Although this is merely representative of one benchmark, it is very often the case that the highest ranked pointed-to object has much greater frequency than the next, and so on.

The dynamic information is typically collected over many, possibly hundreds of input sets, and corresponding frequencies. Unlike model exploration using static pointer analysis, model exploration using dynamic pointer analysis frequency information might be considered unsound, since there may be many pointer dereferences not explored at runtime. Although bugs found using dynamic information are real, there is no guarantee that there are not unfound bugs. However, this is also true with static analysis, in that model checking using static pointer analysis information checks only for bugs found that violate the specification. Thus, there may be bugs in the program that are not found even by model exploration with static pointer analysis information, because they do not identified by (violating) the specification.

Dynamic Pointer Analysis

Empirically

Singleton sets are dereference sites that point-to just one pointee object in memory, and that is the best case scenario for reducing state space explosion, because model exploration does not need to split the state space (at least for that pointer dereference site).

Empirical evidence was accumulated using various benchmarks. Using static pointer analysis, very few singleton sets occur. For most benchmarks, less than 20% of the pointers point-to just one pointee. However, during dynamic pointer analysis including heap pointer dereferences, over 80% of the pointer dereference sites are singleton sets. This greatly reduces the requirements of splitting the state space.

Dynamic pointer analysis is more useful in finding bugs, in the face of exploding state spaces, but it also provides great coverage of the actual points-to set. This information is observable by increasing the number of input sets on the instrumented program and monitoring the number of new pointees visited. For several benchmarks, increasing the number of input sets substantially has very little effect on the average number of pointees. In one such example, an instrumented program is run with 20 input sets and then again with 100 input sets. With 40 input sets, the benchmark shows that the average dereference site points to slightly more than 1.8 pointee objects, and with 100 input sets, the benchmark shows that the average dereference site points to slightly more than 2.0 pointee objects. And, the average number of pointees increases very slowly once the benchmark exceeds about 40 input sets. That same benchmark program when tested with static analysis, indicates that the average dereference site points to 22.12 pointees. Thus, the extent to which state explosion is avoided is empirically validated. The results vary greatly between benchmark programs tested.

Example Refinement

In some cases, a counterexample may not be a bug, if it is generated from model exploration using static pointer analysis information. Symbolic state exploration of the model can be iterative in nature, preferably exploring refinement only as necessary. Assume a program shown in Table E, is explored with a specification including a predicate that a variable "x" remains non-negative. An initial state exploration of Table E may identify an assignment to variable x that violates the predicate. This is initially considered a counterexample for the predicate.

TABLE E

| If (a < 10) then | //condition 1 |
| x:=3 | |
| else | |
| if (a < 5) then | //condition 2 |
| x:=−1 | //assignment |

However, in a next iteration abstraction refinement of the model is considered. A path sensitive analysis of the model of the program, indicates that "condition 2" in Table E will not be reached. Thus, a predicate is added to the path of the model leading to the counterexample, thereby refining the model. Because of the iterative nature of the abstraction refinement, this analysis is unnecessary until a counterexample is indicated. If the model can not be refined, a counterexample is reported as a bug.

It is desirable to not analyze the history of branch predicates until a counterexample is indicated. Predicates are added to the model to refine the feasible state space. Empirically it was determined that bugs generated during model exploration using dynamic analysis pointer information, are generally real bugs. This is because the frequency points-to sets represent reachable nodes in the program under test.

Other Design Considerations

Additionally, the described dynamic points-to pointer analysis tracks objects at the level of structures, based on the point-to memory address. However, this could be adapted to provide object field sensitivity should that be desirable. For example, given a pointer dereference to a field "x" in an object "a", the data structure could include additional data indicating that the pointer dereference "x" is a field of object "a".

Computing Environment

Figure 4:
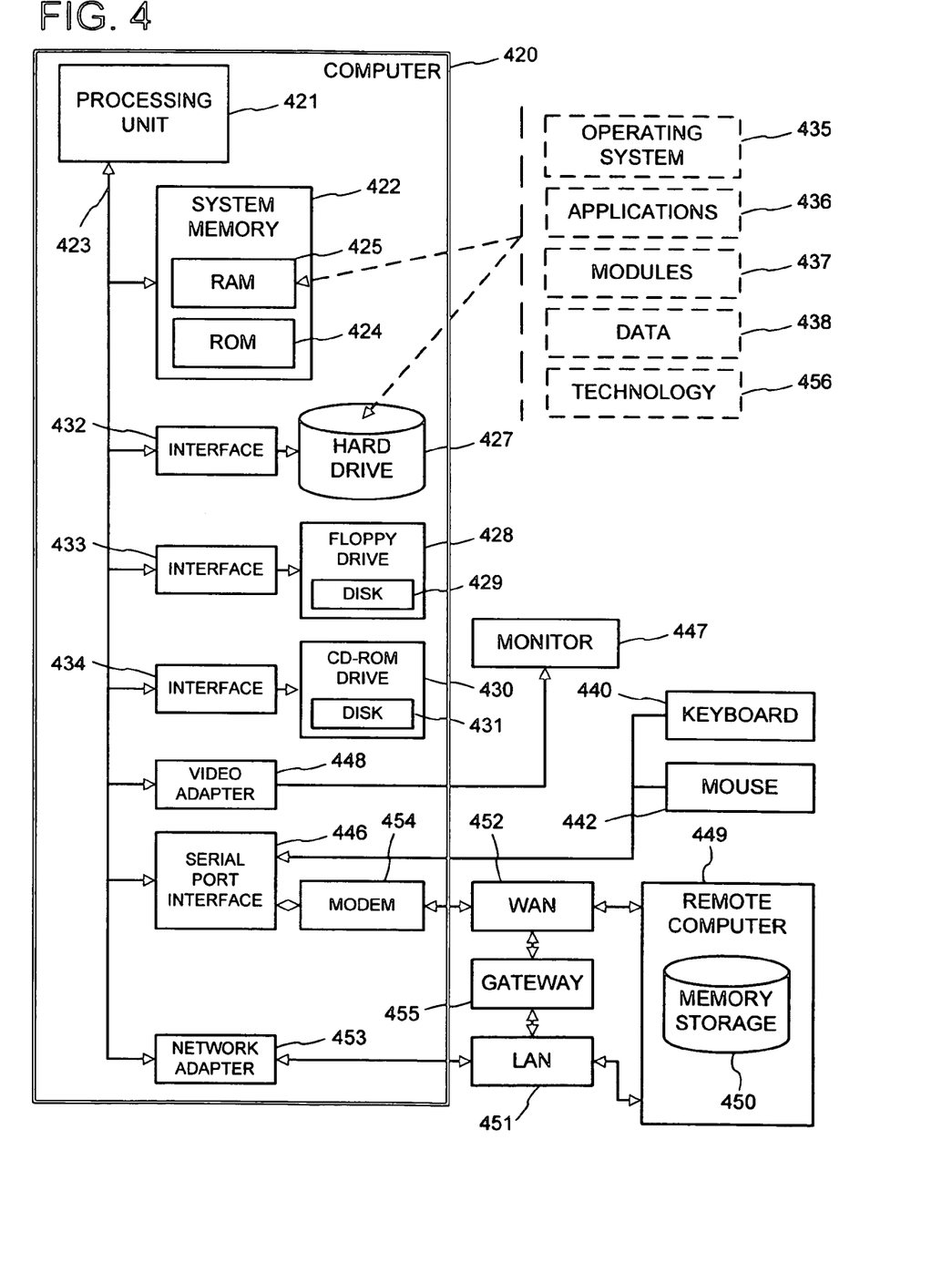
FIG. 4 is a block diagram of a computer system that may be used to implement a method, apparatus, and system using dynamic analysis to identify pointer dereference frequency information.

FIG. 4 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc. that perform particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 4, an exemplary system for implementation includes a conventional computer 420 (such as personal computers, laptops, servers, mainframes, and other variety computers) includes a processing unit 421, a system memory 422, and a system bus 423 that couples various system components including the system memory to the processing unit 421. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 421.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 424 and random access memory (RAM) 425. A basic input/output system (BIOS), containing the basic routines that help to transfer information between elements within the computer 420, such as during start-up, is stored in ROM 424.

The computer 420 further includes a hard disk drive 427, a magnetic disk drive 428, e.g., to read from or write to a removable disk 429, and an optical disk drive 430, e.g., for reading a CD-ROM disk 431 or to read from or write to other optical media. The hard disk drive 427, magnetic disk drive 428, and optical disk drive 430 are connected to the system bus 423 by a hard disk drive interface 432, a magnetic disk drive interface 433, and an optical drive interface 434, respectively. The drives and their associated computer-readable media provide nonvolatile storage of data, data structures, computer-executable instructions, etc. for the computer 420. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 425, including an operating system 435, one or more application programs 436, other program modules 437, and program data 438; in addition to an implementation using dynamic analysis to improve model checking 456.

A user may enter commands and information into the computer 420 through a keyboard 440 and pointing device, such as a mouse 442. These and other input devices are often connected to the processing unit 421 through a serial port interface 446 that is coupled to the system bus, but may be connected by other interfaces, such as a parallel port, game port or a universal serial bus (USB). A monitor 447 or other type of display device is also connected to the system bus 423 via an interface, such as a video adapter 448. In addition to the monitor, computers typically include other peripheral output devices (not shown), such as speakers and printers.

The computer 420 operates in a networked environment using logical connections to one or more remote computers, such as a remote computer 449. The remote computer 449 may be a server, a router, a peer device or other common network node, and typically includes many or all of the elements described relative to the computer 420, although only a memory storage device 450 has been illustrated. The logical connections depicted include a local area network (LAN) 451 and a wide area network (WAN) 452. Such networking environments are commonplace in offices, enterprise-wide computer networks, intranets and the Internet.

When used in a LAN networking environment, the computer 420 is connected to the local network 451 through a network interface or adapter 453. When used in a WAN networking environment, the computer 420 typically includes a modem 454 or other means for establishing communications (e.g., via the LAN 451 and a gateway or proxy server 455) over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing a communications link between the computers may be used.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A computerized method comprising:
   instrumenting a program under test with code that records pointer dereference information;
   executing the instrumented program comprising recording pointer dereference frequency information;
   generating a Boolean program from the program under test; and
   exploring a model based at least on the Boolean program comprising using the pointer dereference frequency information and a points-to graph to direct state space exploration of the model for locating one or more bugs in the program under test;
   wherein exploring the model of the program further comprises exploring the model in an iteration that limits the points-to graph to at least one highest frequency memory location using the pointer dereference frequency information, then again exploring the model in one or more subsequent iterations until memory locations with corresponding pointer dereference frequency information are explored or until at least a bug is reported, wherein a subsequent iteration explores the model directed in part by limiting the points-to graph to a combination of at least one lower dereference frequency memory location and higher frequency memory locations of a preceding iteration.

2. The method of claim 1 further comprising storing the recorded pointer dereference frequency information in a two level data structure wherein a first level of the data structure indexes the high order bits of the memory location and the second level of the data structure indexes the low order bits of the memory location.

3. The method of claim 1 wherein the model is explored using the pointer dereference frequency information upon a failure of exploring the model using static pointer analysis information.

4. The method of claim 1 wherein the state space exploration of the model locates a bug in the program.

5. The method of claim 1 wherein the pointer dereference frequency information is recorded in a data structure indexed by memory locations, and each pointer dereference provides a unique mapping from a numeric value of a pointer to an object it refers to.

6. The method of claim 1 wherein the code that records pointer dereference frequency information instruments pointers at locations where they are dereferenced for writing.

7. The method of claim 6 wherein the locations where pointers are dereferenced for writing are those binary instructions that load or store via an indirect address.

8. The method of claim 1 wherein instrumenting the program under test with code that records pointer dereference frequency information comprises instrumenting separately for each dereference site.

9. The method of claim 8 wherein instrumenting separately for each dereference site includes logic for sampling at a rate that decreases geometrically.

10. The method of claim 1 exploring the model comprising exploring the model iteratively from highest to lowest pointer dereference frequency.

11. The method of claim 10 wherein after the pointer dereference frequency information is explored, exploring the model further comprises exploring a static points-to set.

12. The method of claim 1 wherein recording pointer dereference frequency information comprises writing memory dereference information to a trace file and automatically evaluating the trace file to identify and count pointer dereferences.

13. The method of claim 1 wherein recording pointer dereference frequency information comprises counting memory locations dereferenced by a pointer as the instrumented program executes.

14. The method of claim 1 wherein instrumenting the program under test with code comprises adding calls to a dynamic linked library and recording pointer dereference frequency information comprises executing identifying and counting logic in the dynamic linked library.

15. The method of claim 1 wherein recording pointer dereference frequency information comprises:
on a first dereference, a pointer identifier is added to a data structure; and
on a subsequent dereference of the pointer identifier, the subsequent dereference is counted.

16. A computer system comprising:
a digital processor; and
digital memory comprising,
a program under test,
an abstractor generating a Boolean program using the program under test as input, and
a binary instrumentor instrumenting the program under test to provide pointer dereference frequency information, and
a model checker for exploring a model built based at least on the Boolean program using the pointer dereference frequency information and a points-to graph to focus a state space exploration for locating one or more bugs in the program under test, wherein the exploring the model comprises focusing the exploration of the model in an iteration that limits the points-to graph to at least one highest frequency memory location using the pointer dereference frequency information, then again exploring the model in one or more subsequent iterations until memory locations with corresponding pointer dereference frequency information are explored or until at least a bug is reported, wherein a subsequent iteration explores the model directed in part by limiting the points-to graph using a combination of at least one lower frequency memory location and higher frequency memory locations of a preceding iteration.

17. A computer-readable storage medium having computer-executable instructions that when executed cause a computer to perform a method, the method comprising:
instrumenting a program under test with code that records pointer dereference information;
executing the instrumented program comprising recording pointer dereference frequency information;
generating a Boolean program from the program under test; and
exploring a model constructed based at least on the Boolean program comprising using the pointer dereference frequency information and a points-to graph to direct state space exploration of the model in order to locate one or more bugs in the program under test;
wherein exploring the model of the program further comprises exploring the model in a first iteration that limits the points-to graph to at least one highest frequency memory location using the pointer dereference frequency information, then again exploring the model in one or more subsequent iterations until memory locations with corresponding pointer dereference frequency information are explored or until at least one bug is reported, wherein a subsequent iteration limits the points-to graph to a combination of at least one lower frequency memory location and higher frequency memory locations of a preceding iteration.

18. The computer-readable storage medium of claim 17 wherein the computer-executable instructions further comprise instructions for instrumenting separately for each dereference site.

* * * * *